United States Patent [19]

Shimazutsu et al.

[11] Patent Number: 4,916,824

[45] Date of Patent: Apr. 17, 1990

[54] METHOD FOR MEASURING ROLL PROFILE AND APPARATUS THEREFOR

[75] Inventors: Hiroaki Shimazutsu; Teruyuki Matsumoto; Osamu Miyamoto; Kanji Hayashi, all of Hiroshima, Japan

[73] Assignee: Mitsubishi Jukogyo Kabushiki Kaisha, Tokyo, Japan

[21] Appl. No.: 234,265

[22] Filed: Aug. 19, 1988

[30] Foreign Application Priority Data

Sep. 1, 1987 [JP] Japan .................... 62-218363

[51] Int. Cl.$^4$ ............ G01B 7/28; G01B 7/34
[52] U.S. Cl. ..................... 33/551; 33/533; 33/552; 33/553
[58] Field of Search ............... 33/551, 552, 553, 554, 33/548, 657, 557, 546

[56] References Cited

U.S. PATENT DOCUMENTS

| | | | |
|---|---|---|---|
| 3,056,209 | 10/1962 | Oliver | 33/554 |
| 3,208,151 | 9/1965 | Rawstron | 33/533 |
| 3,328,885 | 7/1967 | Frindel | 33/551 |
| 4,048,849 | 9/1977 | Gocho | 73/105 |
| 4,084,324 | 4/1978 | Whitehous | 33/504 |
| 4,120,093 | 10/1978 | Spies | 33/533 |
| 4,158,258 | 6/1979 | McKechnie | 33/551 |
| 4,213,245 | 7/1980 | Armstrong | 33/558 |
| 4,573,131 | 2/1986 | Corbin | 33/1 Q |
| 4,750,141 | 6/1988 | Judell et al. | 33/551 |
| 4,802,285 | 2/1989 | Ligacz et al. | 33/551 |

FOREIGN PATENT DOCUMENTS

| | | | |
|---|---|---|---|
| 0022909 | 2/1983 | Japan | 33/546 |
| 0159106 | 7/1986 | Japan | 33/551 |
| 0167810 | 7/1986 | Japan | 33/546 |
| 0219822 | 9/1986 | Japan | 33/551 |
| 0162908 | 7/1987 | Japan | 33/551 |
| 0934196 | 6/1982 | U.S.S.R. | 33/546 |

OTHER PUBLICATIONS

Y. Kakino et al., Article from Semitsukikai, vol. 48, 2 (1982), pp. 85-90, "Study of Measuring Method of Straight Motion Error of Machine Tools", with translation of Section 2.3 on p. 87.

Primary Examiner—Allan N. Shoap
Assistant Examiner—Thomas B. Will
Attorney, Agent, or Firm—Stanger, Michaelson, Reynolds, Spivak & Tobia

[57] ABSTRACT

The disclosed method and apparatus measures radial deviations along the axial length of a work roll with a number of axially spaced displacement detectors and at least three axially spaced motion detectors mounted on a detector mount that moves axially along the roll. A calculator responds to the motion detectors to determine errors in the motion of the mount to correct the output of the detectors and sums the deviators to generate overall deviations.

7 Claims, 2 Drawing Sheets

METHOD FOR MEASURING ROLL PROFILE AND APPARATUS THEREFOR

FIELD OF THE INVENTION AND RELATED ART STATEMENT

The present invention relates to measuring deviations in radial size of a work roll of a plate mill, for example, a hot roll mill, and more particularly to a method and apparatus capable of measuring profile of a work roll as it is mounted in its working position in a rolling mill.

It is generally known in plate mill hot rolling operations that a work roll wears locally at the surface which comes into rolling contact with a workpiece to be rolled down. Under such a circumstance, it is essential to control the passing order of a workpiece to be rolled down from a wide extension gauge to a narrow extension gauge in the rolling mill, in an attempt to gain a uniform distribution of thickness of a product plate. In this respect, most modern rolling mills have now adopted such a wide-to-narrow passing order control.

However, this passing order control on the workpieces by their widths has been a substantial bottle-neck to the productivity of the plate mill line, and there has been an increasing demand for the removal of such passing order control in the plate mill operations. For eliminating this passing order control in plate mill operations, a proposal has been made for a so-called "on-line roll grinding means" which serves to grind a service face of a worn work roll in a roll mill to a desired facial configuration as the work roll is mounted in its working position. This work roll grinding required the arrangement to continually grasp the exact roll profile of a workroll to be ground before, after, and during the grinding operation.

FIG. 3 shows, in longitudinal elevation, a typical arrangement of a conventional roll profile measuring operation. FIG. 3 illustrates a housing 1, a work roll 2, a displacement detector 3, and a displacement detector mount 4. This displacement detector mount 4 is mounted slidably along a guide rail 6 supported securely on the support beam 5 in such a manner that it may be shifted by a threaded engagement with a screw rod 7 which is rotated by a motor 8 in the axial direction of the work roll 2. The support beam 5 is held slidably at its both ends on a pair of guides 9 of the housing 1, and also is provided with a pair of locating arms 10 projecting at an interval on the end surfaces thereof facing the work roll 2. On the opposite end surfaces, the support beam 5 is held in a working position by a pair of hydraulic cylinder 11 mounted on the housing 1 or on the pedestal. With this arrangement, the support beam 5 may be pressed against the both lateral ends of the work roll 2 by the locating arms 10, when the hydraulic cylinders 11 are operated, so that the sliding face of the guide rail 6 may be held in a generally parallel relationship with the axial direction of the work roll 2. Consequently, while the support beam 5 is held against the opposed side of the work roll 2 by the cylinders 11, and if the displacement detector 3 is caused to slide along the axial direction of the work roll 2, it is ready to measure a current profile of the work roll 2.

According to this arrangement of measurement, however, there may possibly occur the following problem which has been left unsolved. That is, while it is essential for the guide rail 6 to extend in a generally parallel relationship with the axis of the work roll 2, any deformation or swelling in the guide rail 6, may be added to a measured value obtained at the displacement detector 3. This means low accuracy in the detection of the work roll profile. Particularly when this type of measurement is employed in the hot roll mill, the guide rail 6 may very possibly be deformed from heat during the hot rolling operations, and then this is a problem that spoils accurate measurement of the roll profile.

OBJECT AND SUMMARY OF THE INVENTION

In consideration of such a drawback of the conventional arrangement of roll profile measurement for use in a plate mill as noted above, it would be desirable to attain a solution for eliminating influences of deformation or swelling of a guide rail structure in the profile measuring arrangement from heat or for any other reason, thereby to provide an improved method and apparatus for measuring the roll profile with high accuracy.

The present invention is to provide a useful solution to such a difficulty in practice as referred to above and experienced in the conventional roll profile measurement for use in a plate mill which has been left unattended with any proper countermeasures therefor.

Therefore, it i a primary object of the present invention to provide an improvement in roll profile measurement which can eliminate influences of deformation or swelling in a guide rail structure in a profile measuring arrangement from heat or for any other reason, thus providing an improved method and apparatus for measuring the roll profile with high accuracy.

The present invention comprises providing a plurality of profile measuring displacement detector means over an extension of an elongate displacement detector mount means adapted to move reciprocally along the axis of the work roll for measuring the roll profile over one of a plurality of divided zones extending along the axis of the work roll; providing at least one set consisting of three units of motion error measuring detector means disposed at intervals of La and Lb along the axis of the work roll for measuring errors as the displacement detector mount means move, shifting the displacement detector mount means along the axis of the work roll to locally measure fractional radial deviations of the work roll along the axis thereof by the profile measuring detector means and by the motion error measuring detector means while shifting the displacement detector mount means along the axis of the work roll; calculating a current error in the motion of the displacement detector mount means itself from the result of measurement from the motion error measuring detector means; correcting a current measurement of the profile measuring detector means in conjunction with the errors in the motion of the displacement detector mount means obtained from the calculation; and summing thus-locally measured fractional profile deviations after having been corrected in conjunction with the motion errors of the detector mount means to obtain an eventual radial deviations over the entire extension along the axis of the work roll.

By virtue of the present invention, the following effect may be accomplished. With the provision of the plurality of displacement detectors, a fractional roll profile may be measured including an error in the motion of the displacement detector mount, and with the provision of the specific three displacement detectors, the error in the motion of the displacement detector mount per se may be measured. The measured value of the fractional roll profile inclusive of thus-measured error in the motion of the detectors may then be corrected by an arithmetic operation taking into account the result of measurement of this error in the motion of the detectors, thus providing a true or error-free fractional roll profile, from which an entire roll profile may of course be calculated. With such arrangement, even when there exists a relative motion between the displacement detector mount and the work roll because of a deformation or swell of the detector mount, such undesired influences may be corrected, thus making a highly accurate roll profile measurement.

Additional features and advantages of the invention will now become more apparent to those skilled in the art upon consideration of the following detailed description of a preferred embodiment exemplifying a best mode of carrying out the invention as presently perceived. The detailed description refers particularly to the accompanying drawings, in which like parts are designated at like reference numerals.

DETAILED DESCRIPTION OF A PREFERRED EMBODIMENT

Figure 1:
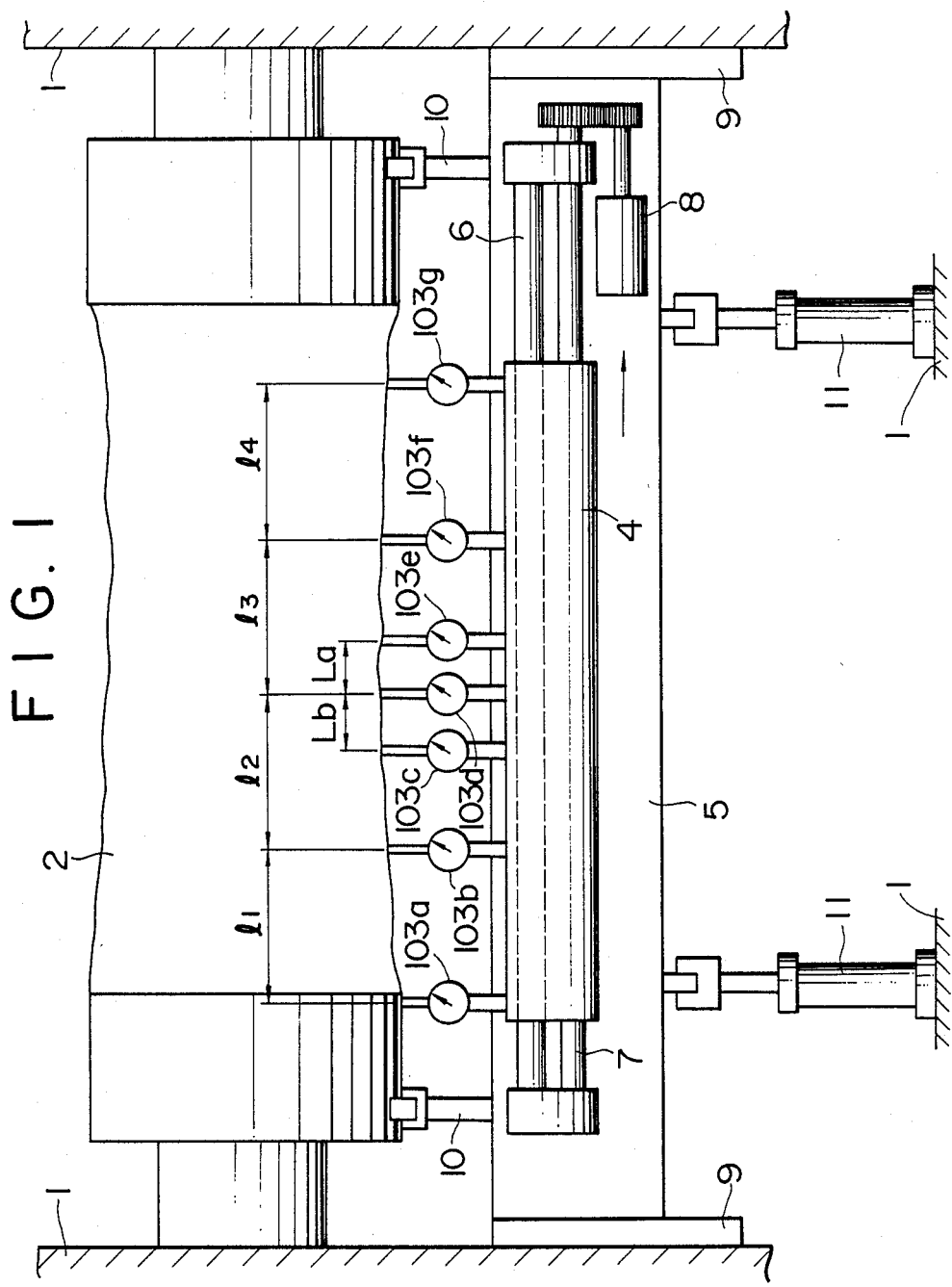
FIG. 1 is a schematic elevational view showing by way of a preferred embodiment the general construction of a roll profile measuring apparatus for use in a rolling mill according to the present invention.
Figure 3:
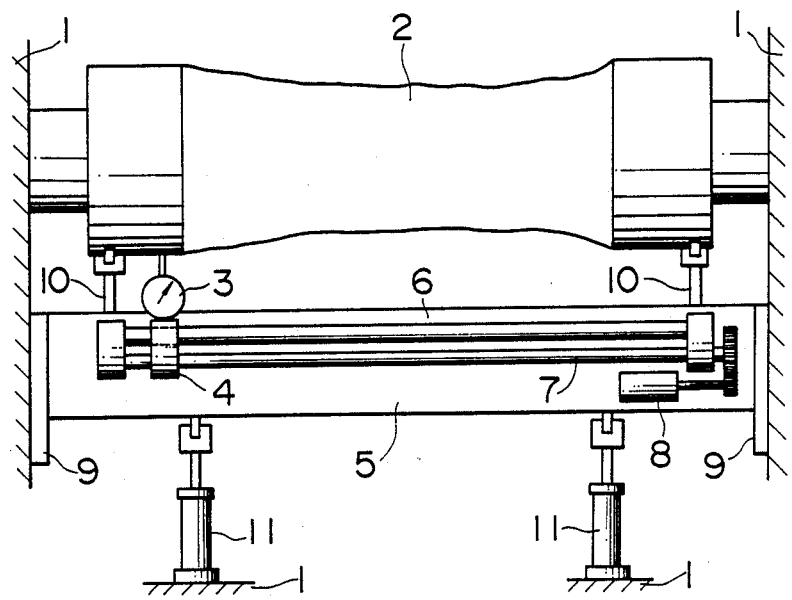
FIG. 3 is a schematic view showing the typical measurement of a roll profile on the conventional roll mill.

The present invention will now be explained in detail by way of a preferred embodiment thereof in conjunction with accompanying drawings herewith. Referring first to FIG. 1, there is shown in transverse elevation an improved roll profile measuring method of the present invention as practiced in an apparatus by way of a preferred embodiment thereof. FIG. 1 illustrates a plurality of displacement detectors for profile measurement 103a, 103b, 103d, 103f, 103g, and three displacement detectors for motion error measurement 103c, 103d, 103e mounted on a displacement detector mount 4 in such a manner that they may operatively detect unevenness or irregularities in the working face of a work roll 2 as it is held in its working position. The displacement detector 103d is adapted to be used either for detection of a roll profile or for detection of an error in the motion of the displacement detector mount. Except for such specific arrangement as noted above, it is of a regular construction as the conventional one typically shown in FIG. 3, and therefore, like parts are designated at like reference numerals, with explanation therefore being omitted accordingly.

The following description will essentially be directed to the specific procedures of operating the method of the invention as practiced in this arrangement of apparatus. Firstly, the displacement detector mount 4 is made to travel along the axis of the work roll 2 or in the direction shown by an arrow heading right as viewed in FIG. 1, as the work roll 2 is rotating. The fractional roll profiles of the work roll 2 are measured over a given range extending along the axis thereof by using the displacement detectors 103a, 103b, 103d, 103f, 103g which are all held in synchronism with the rotating motion of the work roll 2. Here, it is to be noted that such measurement values obtained from these displacement detectors 103a, 103b, 103d, 103f, 103g is a mixture of a true roll profile data and of a possible error in shifting motion of the displacement detector mount 4. Therefore, in order to obtain an entire roll profile data, it is necessary to make the span or distance of shifting motion of the displacement detector mount 4 greater than the intervals of disposition of the displacement detectors 103a, 103b, 103d, 103f, 103g (l1, l2, l3, l4 in FIG. 1), so that the fractional roll profile data as obtained from each of the displacement detectors 103a, 103b, 103d, 103f, 103g may overlap.

Incidentally, assuming that the displacement detector mount 4 is formed to be rigid, and by applying a so-called three-point analytic continuation process which may process the measurement of the displacement detectors 103c, 103d, 103e for detecting possible errors in the motion of the detector mount 4, it is now feasible to grasp a state of shifting motion of the displacement detector mount 4. As a consequence, by knowing a current error in the motion of the displacement detector mount 4 from the measurement at the displacement detectors 103c, 103d, 103e for detecting motion errors, and by correcting each measurement from the displacement detectors 103a, 103b, 103d, 103f, 103g for detecting a current roll profile offset with such motion error of the mount 4, there is obtained a true fractional roll profile data, and from this fractional data there is eventually obtained an entire roll profile data.

Figure 2:
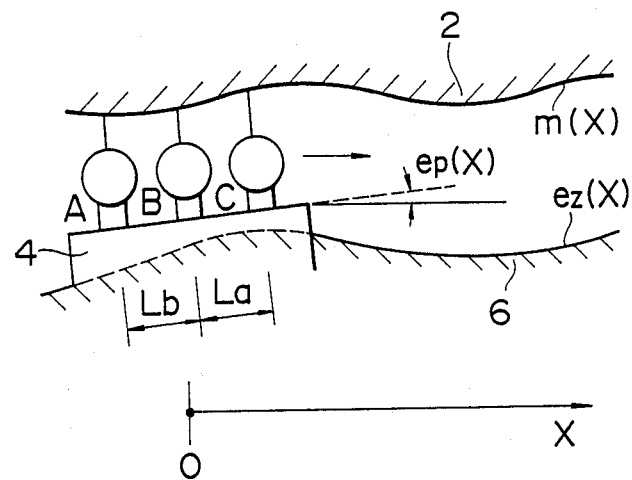
FIG. 2 is a schematic view showing the manner of measuring an error in the motion of a displacement detector mount.

The following is a further explanation will be given of a method to grasp the detailed motion of the displacement detector mount 4. FIG. 2 is a schematic view showing a manner of measuring error in the sliding motion of the displacement detector mount 4. In this figure, there are shown provided three displacement detectors A, B and C corresponding to those 103c, 103d and 103e in FIG. 1, which are mounted at intervals La and Lb relative to each other along the direction of shifting motion of the displacement detector mount 4. In other words, taking the position of the central displacement detector B as a reference point, there is disposed the detector A with the interval Lb left to the reference, while there is another C with the La right from the reference. With such arrangement, a current error in the motion of the displacement detector mount 4 may be calculated from the measurement at the displacement detectors A, B and C as produced when the mount 4 is moved.

Now, there may occur a variety of errors in the motion of the displacement detector mount 4 while it is in shifting motion. Among such errors, the error observed in the plane perpendicular to the sheet of FIG. 1 may have no substantial influence upon the accuracy in measurement of a roll profile, while only the error observed in the plane of sheet, for example, such as a rotating motion and a parallel motion may become a principal factor of the total error in measuring the profile. In this respect, let us take only the case of measurement for rotating motion (pitching motion) as well as parallel shift (swinging motion) of the displacement detector mount 4 in the plane corresponding to that of the sheet. In this case, the measurement is to be conducted while the displacement detector mount 4 is shifted in the direction shown by the arrow in FIG. 2. Also, let us assume that the motion of the displacement detector mount 4 is plotted on X-axis, and that an error in straightness of an object 2 at a distance of shift X from the beginning of measurement or the origin and an extent of swing of a guide plane or guide rail in FIG. 1 are m(X) and ez(X), respectively. Taking the rotating center of pitching motion when shifting the displacement detector mount 4 at the location of the displacement detector B, the values of measurement ya(Xi), yb(Xi), yc(Xi) obtained at the displacement detectors A, B, C positioned at a current distance of shift Xi can be expressed in the following equations;

$$ya(Xi) = m(Xi - Lb) - ez(Xi) - Lb \cdot ep(Xi) \quad (1)$$

$$yb(Xi) = m(Xi) - ez(Xi) \quad (2)$$

$$yc(Xi) = m(Xi + La) - ez(Xi) + La \cdot ep(Xi) \quad (3)$$

where, i=1, 2, 3, , , N. Also, ep(Xi) represents a current amount of pitching motion of the displacement detector mount 4 at the distance of shift Xi.

The following data processing is executed to extract m(Xi), ez(Xi) and ep(Xi) from these data of measurement ya(Xi), yb(Xi) and yc(Xi) obtained as the displacement detector mount 4 travels in sliding motion noted above; i.e., (1) Removal of ez(Xi), ep(Xi) by the Addition ($Y(Xi)$) $= yb(Xi) + a \cdot yc(Xi) + b \cdot ya(Xi)$) of the Measurement ya(Xi), yb(Xi), yc(Xi)

Constants a and b which are determined from the intervals of the displacement detectors La and Lb are:

$$a = -Lb/(La + Lb)$$

$$b = -La/(La + Lb) \quad (4)$$

Then, a combined measurement Y(Xi) may be obtained from the equations (1) through (3), as follows.

$$Y(Xi) = yb(Xi) + a \cdot yc(Xi) + b \cdot ya(Xi) = m(Xi) + a \cdot m(Xi + La) + b \cdot m(Xi - Lb) \quad (5)$$

As notable from the equation (5), the terms concerning ez(Xi) and ep(Xi) may be eliminated from the combined measure Y(Xi), thus leaving only the terms concerning the straightness m(Xi) of the object to be measured. If m(Xi) is expressed in the form of sum of Fourier series, $$m(Xi) = \sum_{j=0}^{n} cj \cdot \cos(2\pi j Xi/L + \phi j) \quad (6)$$

where, L represents the length of an object to be measured. Consequently, the combined measurement value Y(Xi) is $$Y(Xi) = \sum_{j=1}^{n} fj \cdot ci \cdot \cos(2\pi j Xi/L + \phi j + \delta j) \quad (7)$$

where, fj and δj may be expressed in the following equations, respectively; i.e., $$fj = \sqrt{(1 + a \cdot \cos j\alpha + b \cdot \cos j\beta)^2 + (a \cdot \sin j\alpha - b \cdot \sin j\beta)^2}$$

$$\delta j = \tan^{-1}\{-(a \cdot \sin j\alpha - b \cdot \sin j\beta)/(1 + a \cdot \cos j\alpha + b \cdot \cos j\beta)\}$$

and where, α and β are $$\alpha = 2\pi La/L$$

$$\beta = 2\pi Lb/L$$

That is to say, the combined measurement value Y(Xi) is of the one with the amplitude of the straightness m(Xi) of the measuring object 2 increased by fj, and with the phase changed by δj.

(2) Regeneration of Straightness m(Xi) by Fourier Transformation

It is feasible in practice to regenerate the original stream of data m(Xi), the configuration of straightness, from a data stream Y(Xi), combined measurement with amplitude and phase changed, by the Fourier transformation. Developing the data Y(Xi) in the form of the Fourier Series represents:

$$Y(Xi) = \sum_{j=1}^{n} fj \cdot cj \cdot \cos(2\pi j Xi/L + \phi j + \delta j) \quad (8)$$

$$= \sum_{j=1}^{n} \{Fj \cdot \cos(j \cdot 2\pi Xi/L) + Gj \cdot \sin(j \cdot 2\pi Xi/L)\}$$

Making the coefficients in the both sides of this equation (8) correspond to each other, the values Fj and Gj may be expressed as follows:

$$Fj = fj \cdot cj \cdot (\cos \phi j \cdot \cos \delta j - \sin \phi j \cdot \sin \delta j)$$

$$Gj = -fj \cdot cj \cdot (\sin \phi j \cdot \cos \delta j + \cos \phi j \cdot \sin \delta j) \quad (9)$$

Using the values Fj and Gj in the equation (9), the value of straightness m(Xi) may be expressed as follows:

$$m(Xi) = k + \sum_{j=1}^{n} \{(Fj \cdot \cos\delta j - Gj \cdot \sin\delta j) \cdot \cos(j \cdot 2\pi Xi/L) + (Fi \cdot \sin\delta j + Gj \cdot \cos\delta j) \cdot \cos(j \cdot 2\pi Xi/L)\}/fi \quad (10)$$

where, $k = co \cdot \cos \phi o$.

Consequently, developing the data stream Y(Xi) of the combined measurement as obtained from the measured values ya(Xi), yb(Xi), yc(Xi) at three displacement detectors A, B and C into the sum of the Fourier series, the configuration of straightness m(Xi) of an object to be measured may be obtained from the equation (10) above, with the coefficients of the current cosine and sine components being Fj and Gj, respectively.

(3) Calculation of Amounts of Swinging ez(Xi) and Pitching Motion ez(Xi) of Guide Plane Inserting the value m(Xi) obtained from the equation (10) into the equations (1) through (3), a questioned configuration of swinging ez(Xi) of the guide plane 2 and desired pitching motion ep(Xi) observed in the displacement detector mount 4 while it is shifting may be obtained respectively.

The method of measuring a roll profile according to the invention may be summarized as follows. The present invention is:

(1) Effective to measure fractional roll profile inclusive of error in the motion of the displacement detector mount 4 by using the plurality of displacement detectors 103a, 103b, 103d, 103f, 103g;

(2) Effective to measure error in the motion of the displacement detector mount 4 by using three displacement detectors 103c, 103d, 103e;

(3) Effective to correct the measurement obtained in the aspect (1) above on the basis of the results in (2) above, attaining a true fractional roll profile; and (4) Serving to attaining an eventual entire roll profile from the assecement of true fractional roll profile data obtained in (3) above.

In this procedure, as there may possibly occur stepwise deviations among the fractional profile data from the difference in setting the reference of measurement of the displacement detectors 103a, 103b, 103d, 103f, 103g, it is required to compensate for the difference in the reference point of these the displacement detectors so that the fractional measurement values may coincide with each other for a corresponding overlapped extension. Referring more specifically to these procedures of measurement, the aspects (1) and (2) above effective to measure fractional profile inclusive of errors in the motion of the detector mount and measure the specific error in the motion of the mount may be known with a single operation or a single traverse motion of the displacement detector mount 4. As for the aspects (3) and (4) above effective to correct error in the motion of the mount and attain the eventual entire profile data may then be calculated by an electronic computer not shown.

As fully reviewed hereinbefore, the present invention may afford a high-accuracy measurement of a roll profile in the rolling mill, free from undesired influences from deformation or deflection of a guide rail for displacement detecting means owing to heat or for any other reasons.

While the invention is described by a specific embodiment, it is to be understood that the invention is not restricted to this specific embodiment, but many other alterations and modifications can be made without departing from the spirit and scope of the invention. For instance, while there are employed five displacement detectors 103a, 103b, 103d, 103f and 103g for measuring fractional roll profiles and three displacement detectors 103c, 103d and 103e for measuring motion error of the detector mount 4 in the above embodiment, it is of course possible in practice to change the number, the location and the like conditions of the roll profile measuring detectors in conjunction with the width or axial length of the work roll to be measured and the extent of traversal motion or the like conditions on the part of the detector mount 4. Also, an optional number of sets consisting of three units each of displacement detectors for measuring motion errors of the detector mount 4 may be provided in a desired number of positions over the extension of the detector mount 4, as the case may be.

According to the present invention, with the provision of the plurality of displacement detectors, a fractional roll profile may be measured including a possible error in the motion of the displacement detector mount, and with the provision of the specific three displacement detectors, the error in the motion of the displacement detector mount per se may be measured. The measured values of the fractional roll profile inclusive of thus-measured error in the motion of the detectors may then be corrected by an arithmetic operation taking into account the result of measurement of this error in motions of the detectors, which can then provide a true or error-free fractional roll profile, from which an entire roll profile may be deduced by an arithmetic processing. With such arrangement, even when there exists a relative motion between the displacement detector mount and the work roll because of a deformation or swell of the detector mount, such undesired influences can be corrected, thus making a high-accuracy roll profile measurement available in practice. In this manner, there may be attained such an advantageous method which can exhibit a substantial effect in the measurement of a roll profile.

It is to be understood that the appended claims are intended to cover all of such generic and specific features particular to the invention as disclosed herein and all statements relating to the scope of the invention, which as a matter of language might be said to fall thereunder.

What is claimed is:

1. A method of measuring a roll profile with radial deviations along the axis of a work roll of a rolling mill, which comprising the steps of:
   providing a plurality of profile measuring displacement detector means at locations spaced along an elongated displacement detector mount means adapted to reciprocally move along the axis of said work roll for measuring said roll profile over one of a plurality of divided zones extending along the axis of said work roll;
   providing at least three motion error measuring detector means at intervals La and Lb along said displacement detector mount means for measuring errors in motion of said displacement detector mount means at intervals of La and Lb along the axis of said work roll;
   shifting said displacement detector mount means along the axis of said work roll to locally measure fractional deviations of the work roll existing along the axis thereof with said profile measuring displacement detector means and with said motion error measuring detector means;
   calculating a current error in motion of said displacement detector mount means from the result of measurement from said motion error measuring detector means; correcting the measurement of said profile measuring displacement detector means in conjunction with the errors in motion of said displacement detector mount means obtained from said calculation; and
   summing the measured profile deviations after having been corrected in conjunction with the motion errors of said detector mount means to obtain deviations along the entire axis of said work roll.

2. A method as claimed in claim 1, wherein the intervals La and Lb together are a minor fraction of the length of said displacement detector mount means.

3. A method as in claim 1, wherein one of said profile measuring displacement detector means also serves simultaneously as a motion error measuring detector means.

4. A method as in claim 1, wherein one of said profile measuring displacement detector means also serves as a center one of said motion error measuring detector means.

5. An apparatus for measuring a roll profile with radial deviations along the axis of a work roll of a rolling mill, which comprises:
   displacement detector mount means reciprocally movable and generally parallel with the axis of the work roll;
   a plurality of roll profile measuring displacement detector means disposed on said detector mount means at distances along the length thereof and adapted to measure the roll profile over one of a plurality of divided zones extending along the axis of said work roll;

at least three motion error measuring detector means mounted on said mount means with said displacement detector means for measuring errors in motion of said displacement detector mount means at given intervals therebetween along the axis of said work roll; and an arithmetic processor adapted to process the results of measurement by each of said detector means to obtain deviations of said work roll along the axis thereof.

6. An apparatus as in claim 2, wherein the given intervals together are a minor fraction of the length of said displacement detector mount means.

7. A method of measuring a roll profile along the axis of a work roll, which comprises:

shifting support means along the axis of the work roll;

measuring deviations along the axis of the work roll with a plurality of deviation detector means spaced along said support means during motion of said support means;

simultaneously with measuring deviations along the axis of the work roll, measuring motion errors of said support means with motion error detector means at intervals La and Lb along the axis of the said work roll;

calculating an error in the motion of said support means from the measurements from said error detector means;

correcting the measurement of said deviation detector means in conjunction with errors measured by said error detector means; and summing the corrected deviations measured by said deviation detector means in conjunction with the motion errors of said mount means to obtain deviations along the axis of the work roll.

* * * * *